P. JOHNSON.
CULTIVATOR.
APPLICATION FILED MAR. 22, 1909.
948,700.
Patented Feb. 8, 1910.
2 SHEETS—SHEET 1.
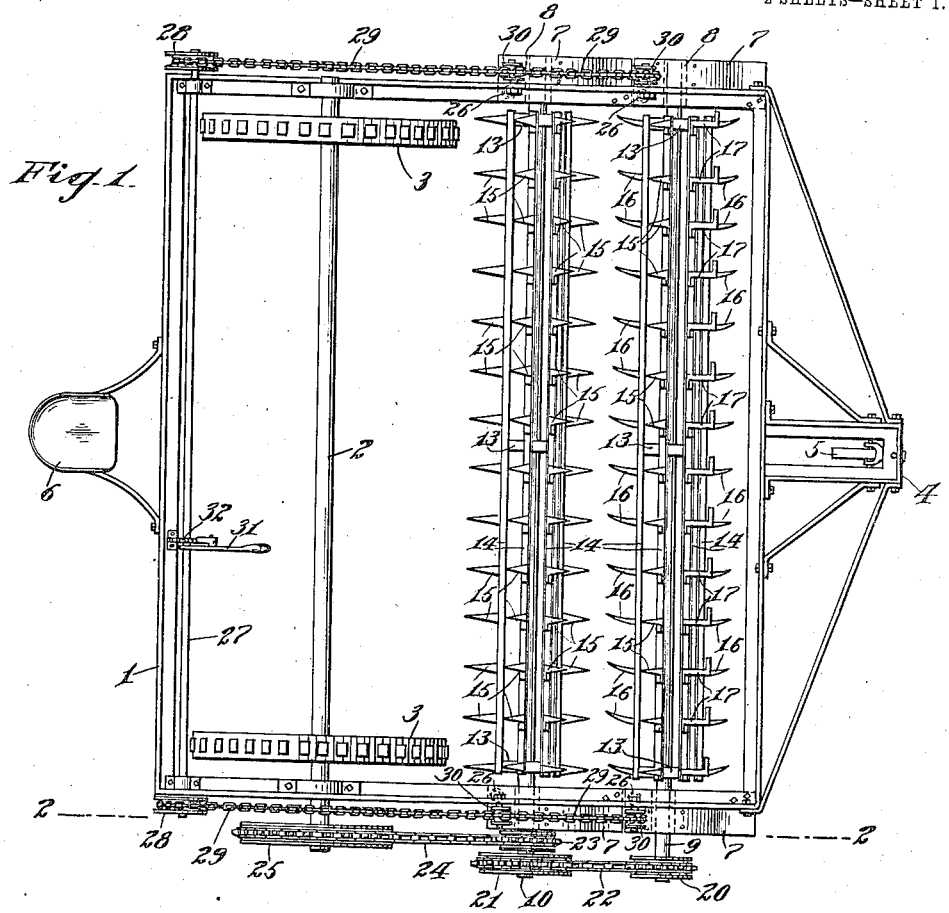
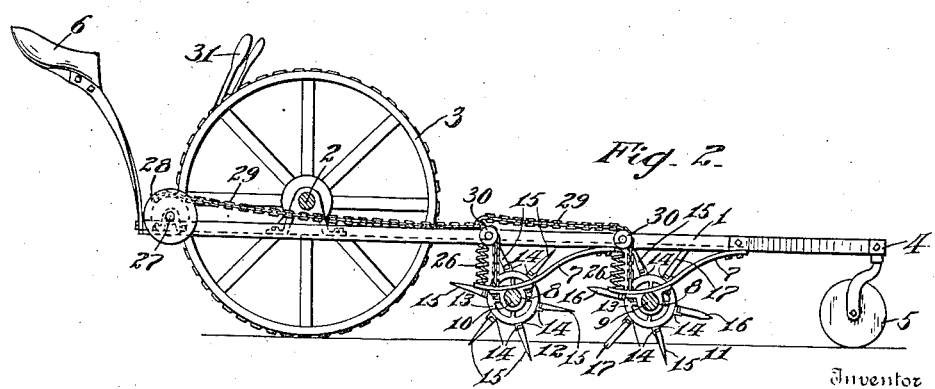
Witnesses
Theo. Rosemond
Janet E. Hogan
Inventor
Peter Johnson,
By Joshua R. H. Potts
Attorney P. JOHNSON.
CULTIVATOR.
APPLICATION FILED MAR. 22, 1909.
948,700.
Patented Feb. 8, 1910.
2 SHEETS—SHEET 2.
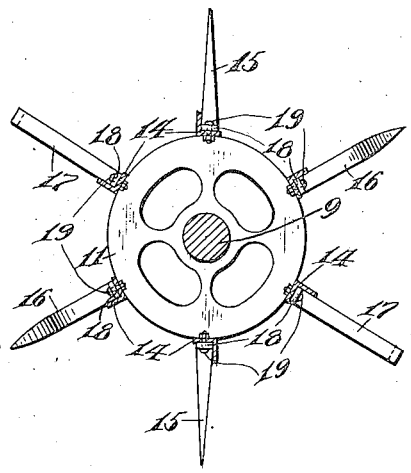
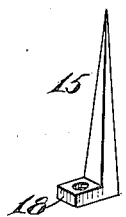
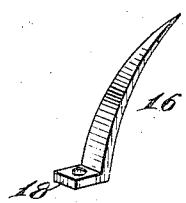
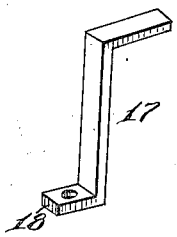
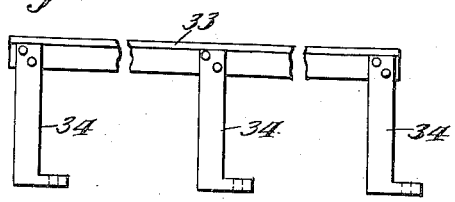
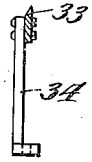
Witnesses
Thos. Rosemann
Janet E. Hogan
Inventor
Peter Johnson,
By Joshua R. H. Potts
Attorney

UNITED STATES PATENT OFFICE.

PETER JOHNSON, OF IRONWOOD, MICHIGAN.

CULTIVATOR.

948,700.

Specification of Letters Patent. Patented Feb. 8, 1910.

Application filed March 22, 1909. Serial No. 485,020.

*To all whom it may concern:*

Be it known that I, PETER JOHNSON, a citizen of the United States, residing at Ironwood, in the county of Gogebic and State of Michigan, have invented certain new and useful Improvements in Cultivators, of which the following is a specification.

My invention relates to improvements in cultivators, and more particularly to an improved rotary cultivator or harrow, the object of the invention being to provide improved mounting for rotary drums carrying an improved arrangement of teeth adapted to effectually break the clods and finely divide the soil.

A further object is to provide an improved machine of this character, with improved means for adjusting or regulating the depth of cultivation.

With these and other objects in view, the invention consists in certain novel features of construction, and combinations, and arrangements of parts as will be more fully hereinafter described and pointed out in the claims.

In the accompanying drawings, Figure 1, is a plan view illustrating my improvements. Fig. 2, is a view in section on the line 2—2 of Fig. 1. Fig. 3, is an enlarged view in cross section of the forward drum. Figs. 4, 5, and 6, are detail perspective views of the different forms of teeth employed on the drums, and Figs. 7 and 8, are views illustrating a modification.

1 represents a horizontal rectangular frame, composed preferably of angle iron, and supported near its rear end upon an axle 2, the latter being mounted in traction wheels 3.

The forward end of the frame 1 is provided with a braced extension 4, supported upon a caster wheel 5, and the device is to be drawn over the ground in any desired manner, and an operator's seat 6 is supported on the rear cross bar of the frame.

On the under face of the side bars of frame 1, and diametrically opposite to each other, are spring bars 7, rigidly secured to the frames at one end as shown, and having bearing sleeves 8 secured thereon, supporting shafts 9 and 10 respectively, it being understood that there are two pairs of these spring supporting bars 7, located one behind the other, so as to support the shafts 9 and 10 in parallel at the forward portion of the frame as clearly shown in Figs. 1 and 2. On these shafts 9 and 10, drums 11 and 12 respectively, are provided, and consist of a series of disks 13 secured rigidly to the shafts, and connected around their peripheries by longitudinal bars 14, there being six bars 14 to each drum, although I do not of course limit myself to any particular number. The forward drum 11 is provided with three different kinds of teeth as shown in detail in Figs. 4, 5 and 6. As above stated, there are six bars on the drums, and the teeth on the opposite bars are alike. On two opposite bars, straight teeth 15 are secured as shown in Fig. 4; on two other of said bars, curved teeth 16, as shown in Fig. 5; and on the remaining two bars, angular teeth 17 as shown in Fig. 6, are employed. The said bars are preferably of angle iron, and all of the teeth are provided with perforated lugs 18 at their inner ends to receive bolts 19, securely clamping the teeth on the bars. The angular teeth 17 as shown in Fig. 6, are very efficacious in breaking clods of dirt, while the curved teeth 16, shown in Fig. 5, and the straight teeth 15, shown in Fig. 4, will most thoroughly cut and pulverize the soil. The drum 12 is provided with teeth 15, such as shown in Fig. 4, on all of its longitudinal bars to most effectually pulverize the soil, not thoroughly cultivated by the forward drum 11.

The shafts 9 and 10 project outwardly to one side of the frame, and are provided with sprocket wheels 20 and 21 respectively, connected by sprocket chain 22. Another sprocket wheel 23 on the shaft 10 is connected by a sprocket chain 24, with a drive sprocket 25, secured upon the axle 2, so that as the machine is drawn over the ground, the revolving of the axle will rotate the drums through the medium of the sprocket wheels and sprocket chains above described.

Coiled springs 26 are disposed between the free ends of spring bars 7 and frame 1, and exert downward pressure on the spring bars to hold the cultivator teeth to their work.

A shaft 27 is mounted in the rear portion of the machine, and is provided with drums 28 connected by chains or other flexible connecting devices 29, with the free ends of spring bars 7, and pass over pulleys 30 on the frame 1. This shaft 27 is turned by a hand lever 31, which may be locked at various adjustments to a notched segment 32, and it will be observed that by manipulating this lever, the drums can be raised or lowered to regulate the depth of cultivation, or lifting them entirely from engagement with the ground when the machine is to be transported from place to place.

Figs. 7 and 8 illustrate a modified construction of longitudinal cutter blades 33, having supporting brackets 34, adapted to be secured to the longitudinal bars of the drums 12, and the cutter blades 33 will take the place of the teeth on the rear drum.

Various slight changes might be made in the general form and arrangements of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In an apparatus of the character described, the combination with a frame, an axle supporting the frame, and traction wheels supporting the axle, of rearwardly and downwardly extending spring bars secured at their forward ends to the frame, a shaft having rotary support on said spring bars, harrow teeth mounted on said shaft, and means for adjusting said spring bars vertically whereby the depth of cultivation may be regulated.

2. In an apparatus of the character described, the combination with a frame, an axle supporting the frame, and traction wheels supporting the axle, of rearwardly and downwardly extending spring bars secured at their forward ends to the frame, coiled springs bearing downwardly on the free ends of said spring bars, a shaft having rotary support on said spring bars, harrow teeth mounted on said shaft, and means for adjusting said spring bars vertically whereby the depth of cultivation by the harrow teeth may be regulated.

3. In an apparatus of the character described, the combination with a frame, an axle supporting the frame, and traction wheels supporting the axle, of spring bars secured at one end to the frame, a shaft having rotary support on said spring bars, a drum on said shaft, teeth on said drum, and means for adjusting said spring bars vertically, whereby the depth of cultivation by the teeth on the drums may be regulated.

4. In an apparatus of the character described, the combination with a frame, of spring bars secured at one end to said frame, coiled springs bearing downward on the free ends of said spring bars, drums having rotary support on said spring bars, teeth on said drums, a shaft supported on said frame, a lever to turn said shaft, pulleys on the frame, and flexible connecting devices between said shaft and the free ends of said spring bars, whereby when said shaft is turned, the spring bars will be moved to adjust the drums vertically.

In testimony whereof I have signed my name to this specification in the presence of two subscribing witnesses.

PETER JOHNSON.

Witnesses:
CHESTER G. ROGERS,
H. M. ERICKSON.